US009816449B2

(12) United States Patent
Miyamoto et al.

(10) Patent No.: US 9,816,449 B2
(45) Date of Patent: Nov. 14, 2017

(54) FUEL SUPPLY CONTROLLING DEVICE FOR DIVIDED-CHAMBER GAS ENGINE

(71) Applicant: KAWASAKI JUKOGYO KABUSHIKI KAISHA, Kobe-shi, Hyogo (JP)

(72) Inventors: Sekai Miyamoto, Kobe (JP); Hidekazu Iwasaki, Kobe (JP); Motohiko Nishimura, Matsudo (JP); Yosuke Nonaka, Himeji (JP)

(73) Assignee: KAWASAKI JUKOGYO KABUSHIKI KAISHA, Kobe-Shi (JP)

( * ) Notice: Subject to any disclaimer, the term of this patent is extended or adjusted under 35 U.S.C. 154(b) by 281 days.

(21) Appl. No.: 14/431,086

(22) PCT Filed: Mar. 3, 2014

(86) PCT No.: PCT/JP2014/001139
§ 371 (c)(1),
(2) Date: Mar. 25, 2015

(87) PCT Pub. No.: WO2014/147978
PCT Pub. Date: Sep. 25, 2014

(65) Prior Publication Data
US 2015/0267631 A1    Sep. 24, 2015

(30) Foreign Application Priority Data
Mar. 22, 2013    (JP) ................. 2013-060683

(51) Int. Cl.
*F02M 43/00* (2006.01)
*F02D 41/00* (2006.01)
(Continued)

(52) U.S. Cl.
CPC ...... *F02D 41/0027* (2013.01); *F02B 19/1038* (2013.01); *F02B 19/12* (2013.01);
(Continued)

(58) Field of Classification Search
CPC ............. F02M 21/0269; F02B 19/1019; F02B 19/1028; F02B 19/1033; F02B 19/1038
See application file for complete search history.

(56) References Cited

U.S. PATENT DOCUMENTS 1,882,513 A * 10/1932 McElhinney ....... F02B 19/1004
                                                       123/143 B
3,113,561 A * 12/1963 Heintz ................ F02B 19/1038
                                                       123/198 F
(Continued)

FOREIGN PATENT DOCUMENTS

JP    H08-105820 A    4/1996
JP    2010-265836 A    11/2010
(Continued)

OTHER PUBLICATIONS

Sep. 9, 2016 Extended Search Report issued in European Patent Application No. 14770240.1.
(Continued)

*Primary Examiner* — Hieu T Vo
*Assistant Examiner* — Sherman Manley
(74) *Attorney, Agent, or Firm* — Oliff PLC

(57) ABSTRACT

A fuel supply controlling device includes: an auxiliary chamber fuel supply valve that supplies a gaseous fuel to an auxiliary chamber; a non-return valve between the auxiliary chamber fuel supply valve and the auxiliary chamber, the non-return valve blocking a reverse flow from the auxiliary chamber; a valve state detector that detects an operating state of the non-return valve; a rotation angle detector that detects a rotation angle within an engine cycle; and a controller that determines an operation command value of the auxiliary chamber fuel supply valve. The controller measures an actual operating state of the non-return valve based on signals from the valve state detector and the rotation angle detector in association with the detected rotation angle, and corrects the operation command value of the auxiliary chamber fuel supply valve such that the mea-
(Continued)

sured actual operating state is brought close to a target operating state.

6 Claims, 9 Drawing Sheets

(51) Int. Cl.
    *F02D 41/30*     (2006.01)
    *F02B 19/12*     (2006.01)
    *F02M 21/02*     (2006.01)
    *F02B 19/10*     (2006.01)
    *F02D 19/02*     (2006.01)
    *F02M 43/04*     (2006.01)

(52) U.S. Cl.
    CPC ....... *F02D 19/024* (2013.01); *F02D 41/3094* (2013.01); *F02M 21/0269* (2013.01); *F02M 21/0284* (2013.01); *F02M 43/04* (2013.01); *Y02T 10/125* (2013.01); *Y02T 10/32* (2013.01)

(56) References Cited

U.S. PATENT DOCUMENTS

| | | | | |
|---|---|---|---|---|
| 4,193,382 A | * | 3/1980 | Oshima | F02B 17/00 123/259 |
| 4,903,656 A | * | 2/1990 | Nakazono | F02B 19/1014 123/253 |
| 5,791,374 A | * | 8/1998 | Black | F02B 19/1033 123/267 |
| 5,950,592 A | * | 9/1999 | Takada | F02B 19/02 123/257 |
| 5,950,593 A | * | 9/1999 | Matsuoka | F02B 19/02 123/292 |
| 6,354,263 B2 | * | 3/2002 | Ibrahim | F02B 17/005 123/261 |
| 6,390,053 B2 | * | 5/2002 | Gillis | F02B 19/12 123/253 |
| 6,814,032 B2 | * | 11/2004 | Goto | F02B 19/10 123/256 |
| 6,883,468 B2 | * | 4/2005 | Lehman | F02B 1/12 123/27 R |
| 7,789,069 B2 | * | 9/2010 | Rodriguez-Amaya | F02M 47/027 123/446 |

FOREIGN PATENT DOCUMENTS

JP      2011-149308 A      8/2011
JP      2012-017695 A      1/2012

OTHER PUBLICATIONS

Jun. 3, 2014 International Search Report issued in International Patent Application No. PCT/JP2014/001139.

* cited by examiner

FUEL SUPPLY CONTROLLING DEVICE FOR DIVIDED-CHAMBER GAS ENGINE

TECHNICAL FIELD

The present invention relates to a fuel supply controlling device applied to a divided-chamber gas engine including a main combustion chamber and an auxiliary chamber.

BACKGROUND ART

In divided-chamber gas engines, it is important to keep a normal combustion state of the auxiliary chamber in order to improve the combustion efficiency of the main combustion chamber to realize energy saving and reduce imperfectly combusted components, including uncombusted hydrocarbon components in exhaust gas, thereby realizing clean conditions. For keeping a normal combustion state of the auxiliary chamber, it is effective to supply a suitable amount of gaseous fuel to the auxiliary chamber in a timely manner. In this respect, in conventional divided-chamber gas engines, an auxiliary chamber fuel supply valve for supplying a gaseous fuel to the auxiliary chamber is configured as a solenoid valve, and opening and closing of the auxiliary chamber fuel supply valve are controlled in accordance with engine operating conditions, such as an engine speed. For example, the valve-opening timing or valve-closing timing of the auxiliary chamber fuel supply valve is set to be a suitable timing for the start of fuel supply or the end of fuel supply to the auxiliary chamber.

In such a divided-chamber gas engine, a non-return valve is interposed between the auxiliary chamber fuel supply valve and the auxiliary chamber. The non-return valve allows a flow from the auxiliary chamber fuel supply valve to the auxiliary chamber, but blocks a reverse flow from the auxiliary chamber, thereby allowing fuel supply to the auxiliary chamber while protecting the auxiliary chamber fuel supply valve from a flame and combusted gas generated in the auxiliary chamber. Conventionally, various operating manners of non-return valves for use in divided-chamber gas engines have been proposed, for example, spring-operated valves, magnet-operated valves, and cam-driven valves.

Patent Literature 1 discloses a spring-operated non-return valve. The valving element of the non-return valve is urged by elastic force of a spring, and thereby the non-return valve is normally in a closed state. When a solenoid valve (an auxiliary chamber fuel supply valve) is opened, the pressure of a gaseous fuel that has passed through the solenoid valve causes the valving element of the non-return valve to move against the elastic force. As a result, the non-return valve opens. Consequently, the gaseous fuel passes through the non-return valve, and is supplied into the auxiliary chamber.

CITATION LIST

Patent Literature

PTL 1: Japanese Laid-Open Patent Application Publication No. 2011-149308

SUMMARY OF INVENTION

Technical Problem

There are cases where the responsiveness of the non-return valve (particularly a spring-operated non-return valve or a magnet-operated non-return valve) to the operation of the auxiliary chamber fuel supply valve changes due to aging degradation or foreign matter getting caught in the non-return valve. However, conventionally, in reality, the auxiliary chamber fuel supply valve is controlled, for example, under the assumption that when the auxiliary chamber fuel supply valve is opened, the non-return valve opens immediately. If the control is continued under such assumption, since an actual supply start timing, an actual supply end timing, and an actual supply duration of the fuel supply to the auxiliary chamber may become deviated from initially estimated timings and duration due to a change in the responsiveness of the non-return valve, there is a risk that the objective of the control, i.e., timely supply of the gaseous fuel to the auxiliary chamber, cannot be achieved. Consequently, it becomes difficult to keep a normal combustion state of the auxiliary chamber, improve the combustion efficiency of the main combustion chamber, and improve components in the exhaust gas.

In view of the above an object of the present invention is to provide a fuel supply controlling device for use in a divided-chamber gas engine, which is capable of supplying a gaseous fuel to an auxiliary chamber in a more timely manner.

Solution to Problem

A fuel supply controlling device for use in a divided-chamber gas engine according to the present invention includes: an auxiliary chamber fuel supply valve configured to supply a gaseous fuel to an auxiliary chamber; a non-return valve interposed between the auxiliary chamber fuel supply valve and the auxiliary chamber, the non-return valve being configured to block a reverse flow from the auxiliary chamber; a valve state detector configured to detect an operating state of the non-return valve; a rotation angle detector configured to detect at least one of a rotation angle of a crank shaft or a rotation angle of a cam shaft; and a controller configured to determine an operation command value of the auxiliary chamber fuel supply valve. The controller measures an actual operating state of the non-return valve based on signals from the valve state detector and the rotation angle detector, the actual operating state being associated with the detected rotation angle, and corrects the operation command value of the auxiliary chamber fuel supply valve such that the actual operating state is brought close to a target operating state.

According to the above configuration, with use of the signals from the valve state detector and the rotation angle detector, the controller detects the operating state of the non-return valve, such as, at what timing the non-return valve opens, for how long the non-return valve stays open, or at what timing the non-return valve closes. The controller corrects the operation command value of the auxiliary chamber fuel supply valve such that the actual operating state of the non-return valve is brought close to a target operating state. In other words, the controller performs feedback control such that the operating state of the non-return valve becomes the target operating state, and operates the auxiliary chamber fuel supply valve in the feedback control.

By performing the above-described control, even if the responsiveness of the non-return valve has changed, the controller can respond to the change in the responsiveness, and cause the non-return valve to operate as initially estimated, which makes it possible to assuredly cause the non-return valve to open in a timely manner. Therefore, an actual supply start timing, an actual supply end timing, and an actual supply duration of the fuel supply to the auxiliary chamber can be suitably controlled. This makes it possible to keep a normal combustion state of the auxiliary chamber, thereby improving the combustion efficiency of the main combustion chamber and improving components in exhaust gas. Moreover, since the controller does not directly operate the non-return valve, it is not necessary to adopt a complex valve-operating method for operating the non-return valve. Furthermore, the fuel supply controlling device with the above-described functions can be incorporated into an existing divided-chamber gas engine without causing a significant change in the shape of the engine body (e.g., the shape around the cylinder head). The present invention is useful also for the reason that such retrofit can be readily made.

The fuel supply controlling device for use in a divided-chamber gas engine may include an operating condition detector configured to detect an operating condition of the gas engine. The controller may set the target operating state in accordance with a signal from the operating condition detector.

According to the above configuration, the controller performs feedback control such that the actual operating state of the non-return valve is brought close to the target operating state, which is set in accordance with the operating condition of the gas engine. Therefore, even if the operating condition of the gas engine has changed, the change is followed and the non-return valve can be caused to continue operating as initially estimated.

The operating state of the non-return valve may include a valve-opening timing of the non-return valve. The controller may measure an actual valve-opening timing of the non-return valve based on signals from the valve state detector and the rotation angle detector, the actual valve-opening timing being associated with the detected rotation angle, and correct the operation command value of the auxiliary chamber fuel supply valve such that the actual valve-opening timing is brought close to a target valve-opening timing.

According to the above configuration, since the controller performs feedback control of the valve-opening timing of the non-return valve, the non-return valve can be caused to open in a timely manner, and thereby the supply start timing of the fuel supply to the auxiliary chamber can be kept to a suitable timing. When performing the feedback control of the valve-opening timing of the non-return valve, the controller corrects the operation command value of the auxiliary chamber fuel supply valve. Since the operation command value is a value utilized in conventional fuel supply control, the control with the above-described functions can be readily realized.

In a case where the actual valve-opening timing is advanced from the target valve-opening timing beyond an allowable advance amount, the controller may perform retard correction of a valve-opening timing of the auxiliary chamber fuel supply valve. In a case where the actual valve-opening timing is retarded from the target valve-opening timing beyond an allowable retard amount, the controller may perform advance correction of the valve-opening timing of the auxiliary chamber fuel supply valve.

According to the above configuration, in a case where the actual valve-opening timing of the non-return valve is advanced from the target valve-opening timing, retard correction of the valve-opening timing of the auxiliary chamber fuel supply valve is performed, and thereby the actual valve-opening timing can be made retarded and brought close to the target valve-opening timing, accordingly. Correction is performed in a similar manner in a case where the actual valve-opening timing is advanced from the target valve-opening timing.

The operating state of the non-return valve may include a valve-closing timing of the non-return valve. The controller may measure an actual valve-closing timing of the non-return valve based on signals from the valve state detector and the rotation angle detector, the actual valve-closing timing being associated with the detected rotation angle, and correct the operation command value of the auxiliary chamber fuel supply valve such that the actual valve-closing timing is brought close to a target valve-closing timing.

According to the above configuration, since the controller performs feedback control of the valve-closing timing of the non-return valve, the valve-open duration of the non-return valve can be kept to a suitable duration, and the non-return valve can be caused to close in a timely manner. Accordingly, the supply end timing of the fuel supply to the auxiliary chamber can be kept to a suitable timing. When performing the feedback control of the valve-closing timing of the non-return valve, the controller corrects the operation command value of the auxiliary chamber fuel supply valve. Since the operation command value is a value utilized in conventional fuel supply control, the control with the above-described functions can be readily realized. It should be noted that by performing feedback control of both a valve-closed duration and the valve-opening timing of the non-return valve, the valve-open duration can be kept as initially estimated. This makes it possible to keep a suitable supply amount and a suitable supply duration of the fuel supply to the auxiliary chamber.

The non-return valve may include a valving element allowed to move between a closing position, at which the valving element closes a fuel port open to the auxiliary chamber, and a fully open position, which is away from the closing position. The non-return valve opens when the fuel port is opened as a result of the valving element moving from the closing position toward the fully open position. The valve state detector may be configured to detect a moving amount of the valving element. The controller may measure an actual integral value of a moving amount transition regarding the moving amount of the valving element, the moving amount being associated with the detected rotation angle, based on signals from the valve state detector and the rotation angle detector, and determine whether or not the non-return valve is operating normally based on a result of comparison of the measured actual integral value with a target integral value of the moving amount transition.

In light of that the feedback control is performed by the controller so that the valve-opening timing and valve-closing timing of the non-return valve will not deviate from initially estimated timings, if the moving amount of the non-return valve is excessive or the moving amount of the non-return valve is insufficient, the difference between the target integral value and the actual integral value is great. When the moving amount of the non-return valve is excessively great or excessively small, the amount or pressure of the fuel passing through the non-return valve is excessively greater or excessively less than initially estimated. In this situation, it is difficult to keep a normal combustion state in the auxiliary chamber. The above-described configuration makes it possible to detect such a situation and determine whether or not the non-return valve is operating normally.

Advantageous Effects of Invention

As is clear from the above description, the present invention makes it possible to provide a fuel supply controlling device for use in a divided-chamber gas engine, which is capable of supplying a gaseous fuel to an auxiliary chamber in a more timely manner.

DESCRIPTION OF EMBODIMENTS

Figure 1:
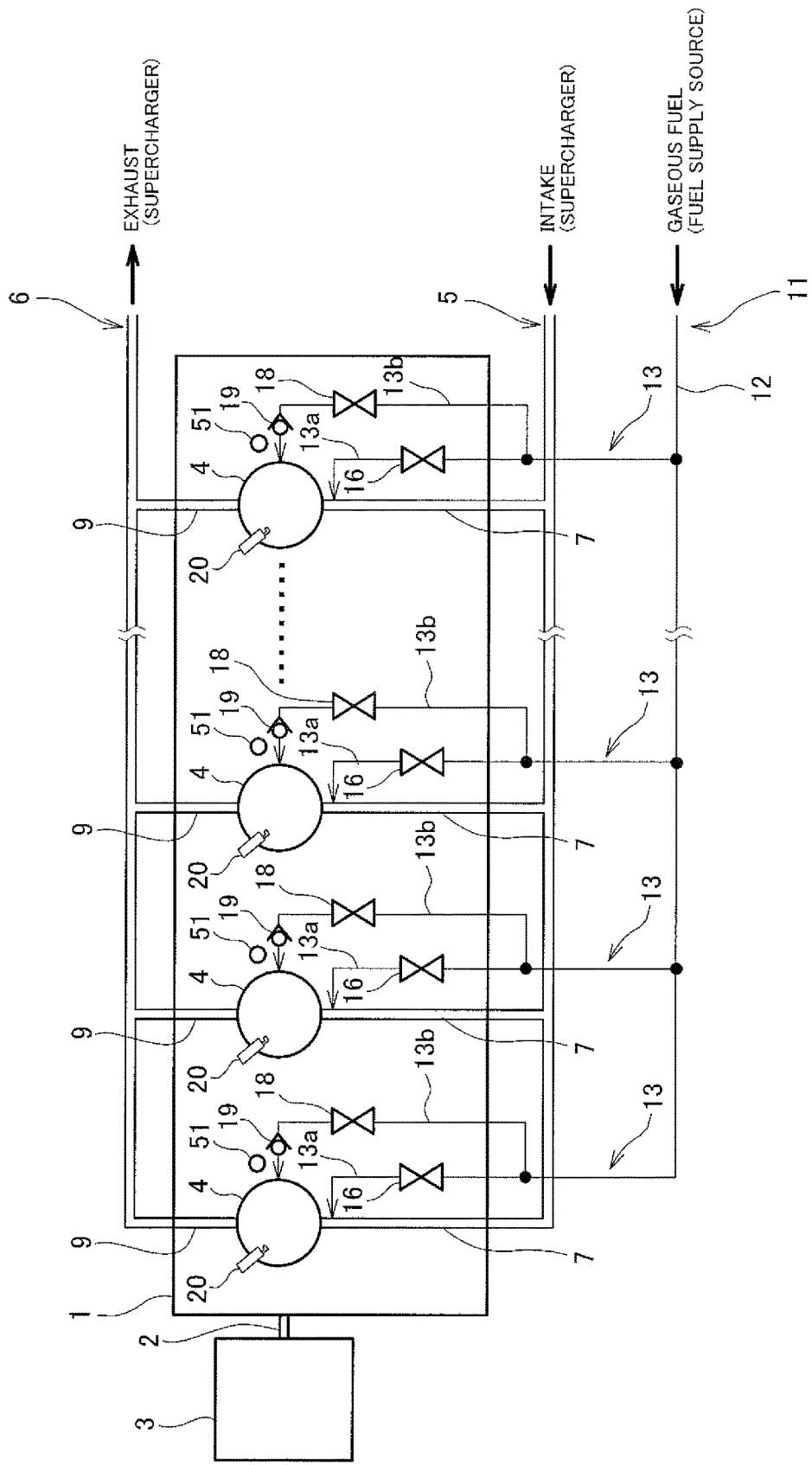
FIG. 1 is a conceptual diagram showing an overall configuration of a gas engine according to one embodiment.

Hereinafter, one embodiment of the present invention is described with reference to the drawings. In the drawings, the same or corresponding elements are denoted by the same reference signs, and repeating the same detailed descriptions is avoided below.

[Overall Configuration of Gas Engine]

FIG. 1 is a conceptual diagram showing an overall configuration of a gas engine 1 according to the embodiment. The gas engine 1 shown in FIG. 1 combusts an air-fuel mixture of a gaseous fuel and intake air, and generates a rotation output by means of an output shaft 2. The output shaft 2 is connected to a load 3. Examples of the load 3 include an AC power generator and a marine propeller. The gas engine 1 according to the present embodiment is suitably utilized, for example, as a driving source of a power generator or as a marine main engine.

The gas engine 1 is a divided-chamber reciprocating four-stroke engine. A plurality of cylinders 4 are arranged inside the engine's body. The manner of arranging the cylinders 4 is not limited to parallel arrangement shown in FIG. 1, which is merely one arrangement example adopted for the sake of convenience of illustration. Alternatively, V-shaped arrangement may be adopted. The gas engine 1 is provided with an intake passage 5 and an exhaust passage 6. The intake passage 5 is a passage for supplying intake air from a supercharger to the cylinders 4, and includes a plurality of intake ports 7 corresponding to the respective cylinders 4. The exhaust passage 6 is a passage for supplying exhaust gas from each of the cylinders 4 to the supercharger and/or discharging the exhaust gas to outside air, and includes a plurality of exhaust ports 9 corresponding to the respective cylinders 4.

The gas engine 1 is provided with a fuel line 11 for supplying a gaseous fuel from a fuel supply source to each of the cylinders 4. The fuel line 11 includes: a shared line 12 extending from the fuel supply source; and a plurality of branch lines 13 corresponding to the respective cylinders 4. Each branch line 13 includes a main fuel line 13a and an auxiliary chamber fuel line 13b. The main fuel line 13a is a line leading the gaseous fuel from the fuel supply source to the intake port 7 of the corresponding cylinder 4. For example, the main fuel line 13a connects the shared line 12 to the intake port 7. The auxiliary chamber fuel line 13b is a line leading the gaseous fuel from the fuel supply source to an auxiliary chamber 24 (see FIG. 2) of the corresponding cylinder 4. For example, the auxiliary chamber fuel line 13b connects the shared line 12 to the auxiliary chamber 24.

Main fuel supply valves 16, auxiliary chamber fuel supply valves 18, non-return valves 19, and ignitors 20 are provided corresponding to the respective cylinders 4. Each of the main fuel supply valves 16 is disposed on a corresponding one of the main fuel lines 13a. Each of the auxiliary chamber fuel supply valves 18 and each of the non-return valves 19 are disposed on a corresponding one of the auxiliary chamber fuel lines 13b. Each of the ignitors 20 ignites the air-fuel mixture in a corresponding one of the auxiliary chambers 24 (see FIG. 2).

Figure 2:
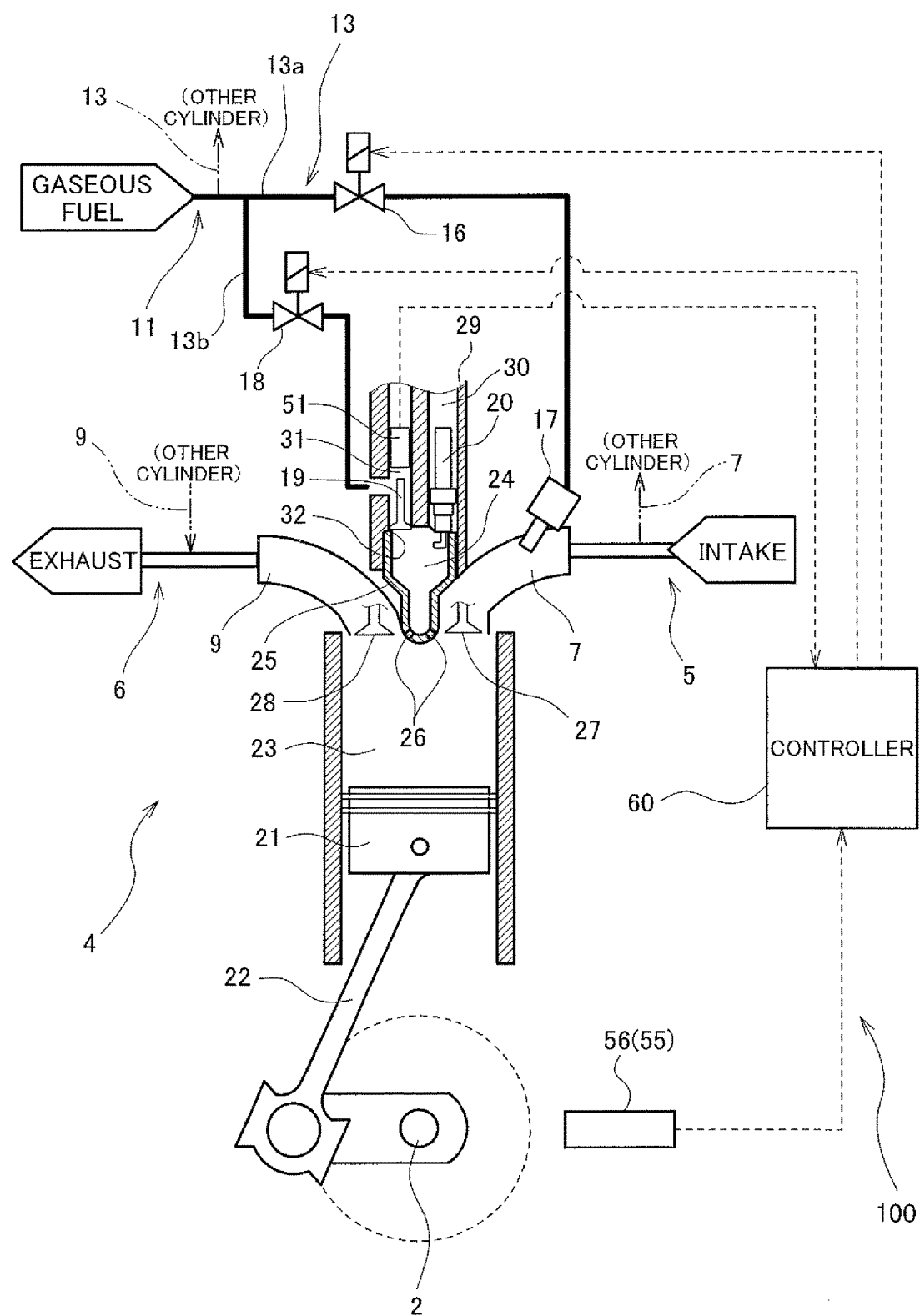
FIG. 2 is a conceptual diagram showing a schematic configuration of a fuel supply controlling device applied to the gas engine shown in FIG. 1 together with a peripheral configuration of a cylinder.

FIG. 2 is a conceptual diagram showing a schematic configuration of a fuel supply controlling device 100 applied to the gas engine 1 shown in FIG. 1 together with a peripheral configuration of a cylinder 4. First, the peripheral configuration of the cylinder 4 is described with reference to FIG. 2. Although FIG. 2 shows only one cylinder 4, the description below is also applied to the other cylinders 4. As shown in FIG. 2, a piston 21 is inserted in the cylinder 4 such that the piston 21 can move in a reciprocating manner in the cylinder 4. The piston 21 is connected to the output shaft 2 via a connecting rod 22. In the cylinder 4, a space adjacent to the top surface of the piston 21 forms a main combustion chamber 23. The main combustion chamber 23 is separated from the auxiliary chamber 24 by a partition wall 25, but is in communication the auxiliary chamber 24 via communication holes 26 formed in the partition wall 25. The intake port 7 and the exhaust port 9 are open in the ceiling portion of the main combustion chamber 23. An intake valve 27 opens and closes the intake port 7, and an exhaust valve 28 opens and closes the exhaust port 9.

The partition wall 25 is bowl-shaped, and its upper part is open. The auxiliary chamber 24 is formed inside the partition wall 25. The lower part of the partition wall 25 forms part of the ceiling portion of the main combustion chamber 23, and the communication holes 26 extend through the lower part of the partition wall 25. The partition wall 25 is covered from above by a fixture 29. The lower part of the fixture 29 forms part of the ceiling portion of the auxiliary chamber 24. The fixture 29 includes: an ignitor hole 30, in which the ignitor 20 is housed; and a fuel passage 31, which forms the downstream end portion of the auxiliary chamber fuel line 13b. The ignitor hole 30 is open at the lower part of the fixture 29. FIG. 2 shows an example where a spark plug serves as the ignitor 20. The spark-generating electrode of the spark plug is positioned in the ignitor hole 30 such that the electrode protrudes into the auxiliary chamber 24 through the opening of the ignitor hole 30. However, as an alternative, a pilot fuel injection valve may serve as the ignitor 20.

In an intake stroke, the intake valve 27 and the main fuel supply valve 16 are opened. The gaseous fuel from the fuel supply source passes through the main fuel supply valve 16, and is injected into the intake port 7 from a fuel nozzle 17 disposed at the downstream end of the main fuel line 13a. The injected gaseous fuel is supplied into the main combustion chamber 23 together with intake air. In a compression stroke, the air-fuel mixture is compressed in the main combustion chamber 23, and the compressed air-fuel mixture is also supplied into the auxiliary chamber 24 through the communication holes 26. The ignitor 20 operates near the end of the compression stroke to combust the air-fuel mixture in the auxiliary chamber 24. A flame that is generated in the auxiliary chamber 24 propagates into the main combustion chamber 23 through the communication holes 26, and thereby the air-fuel mixture in the main combustion chamber 23 is also combusted. In an exhaust stroke after an expansion stroke, the exhaust valve 28 opens the exhaust port 9, and the combusted gas in the main combustion chamber 23 and the auxiliary chamber 24 is discharged to the exhaust passage 6.

The fuel passage 31 includes a fuel port 32, which is formed at the lower part of the fixture 29 and which forms an opening in the ceiling portion of the auxiliary chamber 24. The auxiliary chamber fuel line 13b is in communication with the auxiliary chamber 24 via the fuel port 32. The non-return valve 19 is provided on the auxiliary chamber fuel line 13b, and interposed between the auxiliary chamber fuel supply valve 18 and the auxiliary chamber 24. The non-return valve 19 allows a flow of the gaseous fuel from the auxiliary chamber fuel supply valve 18 (in other words, from the fuel supply source) into the auxiliary chamber 24, but blocks a reverse flow from the auxiliary chamber 24 toward the auxiliary chamber fuel supply valve 18. In the present embodiment, the non-return valve 19 is attached to the fixture 29 and housed in the fuel passage 31. The non-return valve 19 opens and closes the fuel passage 31 or the fuel port 32. Normally, the non-return valve 19 blocks the reverse flow in a valve-closed state in which the fuel port 32 is closed, and allows the aforementioned flow in a valve-opened state in which the fuel port 32 is opened.

The auxiliary chamber fuel supply valve 18 is opened in a timely manner during the intake stroke, and closed in a timely manner during the compression stroke or exhaust stroke. The auxiliary chamber fuel supply valve 18 is a solenoid valve. Specifically, the auxiliary chamber fuel supply valve 18 is a normally closed valve and is an on-off valve. It should be noted that FIG. 2 shows an example, in which the auxiliary chamber fuel supply valve 18 is disposed outside the fixture 29. However, as an alternative, the auxiliary chamber fuel supply valve 18 may be disposed on or inside the fixture 29. The gas engine 1 is provided with a controller 60 configured to control the auxiliary chamber fuel supply solenoid valve 18. The controller 60 determines operation command values of the auxiliary chamber fuel supply valve 18 (i.e., a valve-opening timing, a valve-closing timing, and a valve-open duration), and drives the auxiliary chamber fuel supply valve 18 in accordance with the operation command values.

During the valve-open duration of the auxiliary chamber fuel supply valve 18, the gaseous fuel from the fuel supply source passes through the auxiliary chamber fuel supply valve 18, and is supplied into the fuel passage 31. The non-return valve 19 opens in response to the opening of the auxiliary chamber fuel supply valve 18. As a result, the gaseous fuel passes through the non-return valve 19, and is supplied into the auxiliary chamber 24 through the fuel port 32. When the auxiliary chamber fuel supply valve 18 is closed, the non-return valve 19 closes in response to the closing of the auxiliary chamber fuel supply valve 18. As a result, the supply of the gaseous fuel to the auxiliary chamber 24 is stopped. In the expansion stroke and exhaust stroke, each of which is a valve-closed duration of the auxiliary chamber fuel supply valve 18, the non-return valve 19 prevents the combusted gas from reversely flowing from the auxiliary chamber 24 along the auxiliary chamber fuel line 13b, thereby protecting the auxiliary chamber fuel supply valve 18, which is a solenoid valve, from the combusted gas.

The air-fuel mixture in the auxiliary chamber 24 is a result of the air-fuel mixture supplied from the main combustion chamber 23 being mixed with the gaseous fuel led to the auxiliary chamber fuel line 13b. Therefore, the air-fuel mixture in the auxiliary chamber 24 is a richer air-fuel mixture than the air-fuel mixture in the main combustion chamber 23. The valve-open duration of the auxiliary chamber fuel supply valve 18 is determined in accordance with engine operating conditions so that the fuel can be supplied into the auxiliary chamber 24 through the fuel port 32 in an amount that is necessary for the excess air ratio of the air-fuel mixture generated in the auxiliary chamber 24 to become a required value. The fuel pressure is adjusted to be substantially constant on the shared line 12. Accordingly, the amount of fuel that passes through the auxiliary chamber fuel supply valve 18 can be adjusted by adjusting the valve-open duration of the auxiliary chamber fuel supply valve 18. The valve-opening timing and the valve-closing timing of the auxiliary chamber fuel supply valve 18 are determined in accordance with the engine operating conditions so that, even if the internal pressure of the auxiliary chamber 24 is increasing for the reason that the compression stroke is in progress, the aforementioned necessary amount of fuel can be properly supplied into the auxiliary chamber 24 through the fuel port 32 in a manner to resist against the internal pressure, and so that the gaseous fuel supplied through the fuel port 32 can be uniformly spread in the auxiliary chamber 24 to realize uniform fuel concentration distribution in the auxiliary chamber 24 before an ignition timing.

The auxiliary chamber fuel supply valve 18 operates in accordance with the operation command values (i.e., a valve-opening timing, a valve-closing timing, and a valve-open duration) determined in the above-described manner, thereby supplying the gaseous fuel into the auxiliary chamber 24 in a suitable amount in a timely manner in accordance with the engine operating conditions to control the excess air ratio of the air-fuel mixture and the fuel concentration distribution in the auxiliary chamber 24 as intended. In this manner, the combustion in the auxiliary chamber 24 is kept in a normal state, and consequently, a flame is suitably caused to propagate to the main combustion chamber 23 such that the combustion in the main combustion chamber 23 is kept in a normal state, thereby increasing the combustion efficiency in the cylinder 4 and improving components in the exhaust gas.

The gaseous fuel that has passed through the auxiliary chamber fuel supply valve 18 does not reach the inside of the auxiliary chamber 24 unless the gaseous fuel passes through the non-return valve 19. Accordingly, in order to achieve the above-described objective of the control, the responsiveness of the non-return valve 19 to the opening and closing of the auxiliary chamber fuel supply valve 18 is required to be as estimated. Therefore, the fuel supply controlling device 100, which performs control to keep the operation of the non-return valve 19 as initially estimated, is applied to the gas engine 1. According to the fuel supply controlling device 100, even if the non-return valve 19 degrades, or foreign matter gets caught in the non-return valve 19, or there is an individual difference in the non-return valve 19, or the non-return valve 19 is operated in a manner that does not allow active open-close control (e.g., spring-operated or magnet-operated), the operation of the non-return valve 19 can be continuously stabilized.

[Fuel Supply Controlling Device]

The fuel supply controlling device 100 includes valve state detectors 51 and a rotation angle detector 56 in addition to the above-described auxiliary chamber fuel supply valves 18, non-return valves 19, and controller 60. The auxiliary chamber fuel supply valves 18, the non-return valves 19, and the valve state detectors 51 are provided for the respective cylinders 4 (see FIG. 1). The rotation angle detector 56 and the controller 60 are both single devices, and are common to the plurality of cylinders 4. The rotation angle detector 56 detects at least one of the rotation angle of the output shaft (crank shaft) 2 or the rotation angle of a cam shaft (not shown). For example, the controller 60 includes a CPU, a ROM, a RAM, and an input/output interface as main components. The output of the controller 60 is connected to the plurality of auxiliary chamber fuel supply valves 18, which are provided for the plurality of cylinders 4, respectively. The controller 60 determines operation command values of each of the auxiliary chamber fuel supply valves 18. The output of the controller 60 may be connected to the main fuel supply valves 16 and the ignitors 20.

The input of the controller 60 is connected to the plurality of valve state detectors 51 and the single rotation angle detector 56. Each of the valve state detectors 51 detects the operating state of a corresponding one of the non-return valves 19. The detected operating state includes whether or not the non-return valve 19 is in a valve-opened state. As described below, if the non-return valve 19 is a lift non-return valve, the operating state may include a lift amount of the non-return valve 19. The controller 60 may measure whether or not the non-return valve 19 is in a valve-opened state by referring to the lift amount.

Figure 3:
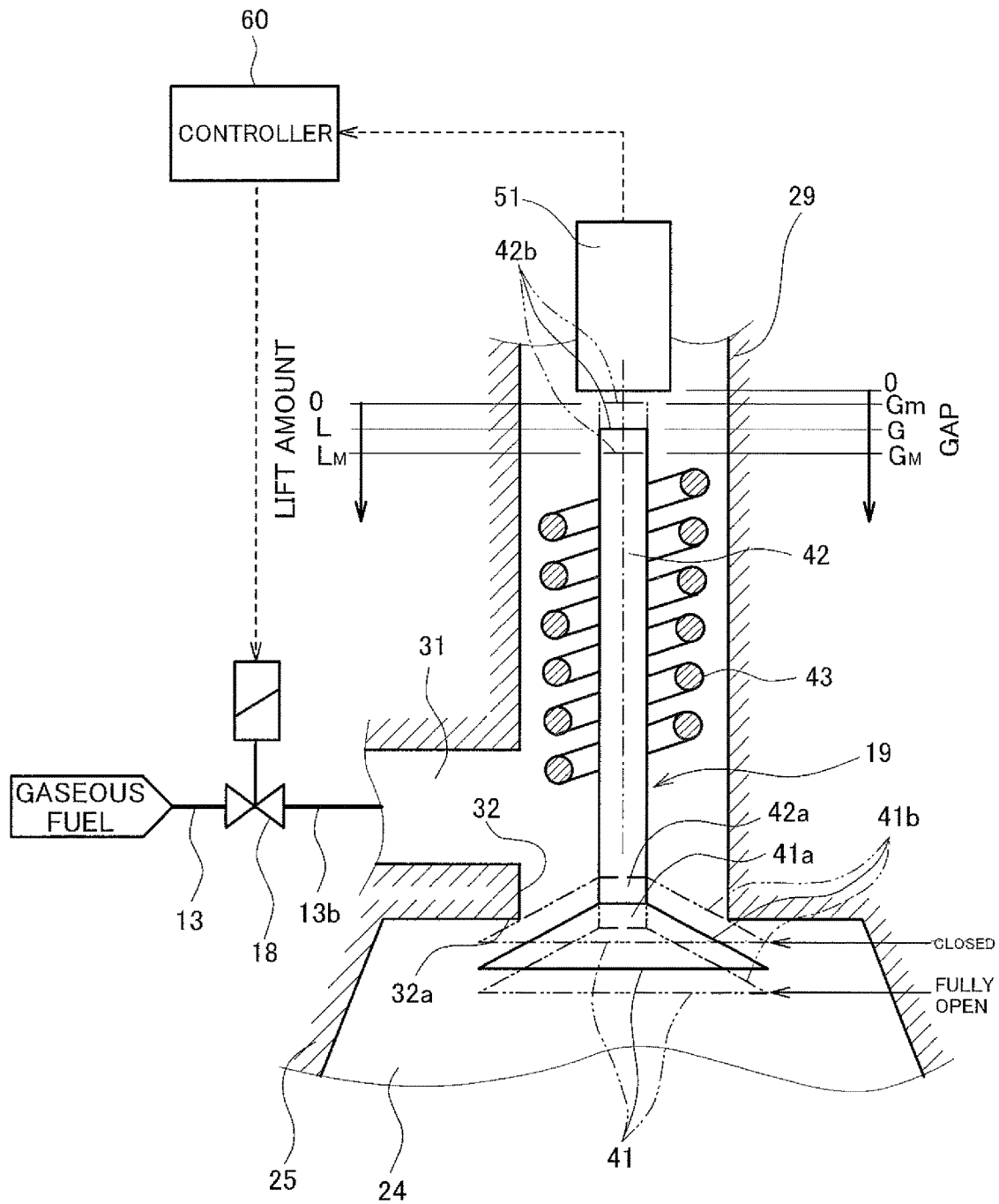
FIG. 3 is a conceptual diagram showing one example of configurations of a non-return valve and a valve state detector shown in FIG. 2.

FIG. 3 is a conceptual diagram showing one example of configurations of the non-return valve 19 and the valve state detector 51 shown in FIG. 2. As shown in FIG. 3, the non-return valve 19 includes a valving element 41, which is allowed to move between a closing position and a fully open position. At the closing position, the valving element 41 closes the fuel port 32, which is open to the auxiliary chamber 24. The fully open position is away from the closing position. The fuel port 32 is opened as a result of the valving element 41 moving from the closing position toward the fully open position.

In the present embodiment, the non-return valve 19 is configured as a lift non-return valve operated in such a manner that the valving element 41 is moved by fuel pressure, and is a poppet valve. Specifically, a valve shaft 42 is housed in the fuel passage 31, such that the valve shaft 42 can move inside the fuel port 32. An end portion 42a of the valve shaft 42, which is positioned on the opening side of the moving direction of the valve shaft 42 (i.e., positioned on the lower side of FIG. 4), is connected to a head portion 41a of the valving element 41, which has a low-height conical shape or a mushroom shape. When the auxiliary chamber fuel supply valve 18 is closed, the fuel supply to the fuel passage 31 is stopped, and urging force of the urging member 43 urges the valving element 41 and the valve shaft 42 toward the closing side of the moving direction (toward the upper side of FIG. 4), so that a face portion 41b of the valving element 41 is seated onto a valve seat 32a at the periphery of the fuel port 32 from the inside of the auxiliary chamber 24, and thereby the valving element 41 and the valve shaft 42 stop at the closing position. In this manner, the fuel port 32 is closed, and the non-return valve 19 becomes a valve-closed state. When the auxiliary chamber fuel supply valve 18 is opened, a surface of the face portion 41b of the valving element 41, the surface facing the inside of the fuel passage 31, receives fuel pressure and thereby the valving element 41 and the valve shaft 42 move from the closing position toward the opening side of the moving direction in a manner to resist against the urging force. Consequently, the valving element 41 becomes spaced apart from the valve seat 32a to open the fuel port 32, and thus the non-return valve 19 becomes a valve-opened state. The fully open position is away from the closing position toward the opening side of the moving direction by a maximum lift amount LM. The valving element 41 and the valve shaft 42 are allowed to move from the closing position to the fully open position toward the opening side of the moving direction (i.e., the axial direction of the valve shaft 42, the direction normal to the fuel port 32, and the direction perpendicular to the valve seat 32a).

FIG. 3 shows a spring that exerts its elastic force as the aforementioned urging force as one example of the urging member 43. However, as an alternative, the urging member 43 may be a magnet that exerts its magnetic attraction as the aforementioned urging force (i.e., the non-return valve 19 is not limited to a spring-operated valve, but may be a magnet-operated valve). FIG. 3 illustratively shows a coil spring disposed around the outer periphery of the valve shaft 42, and the coil spring is deformed inside the fuel passage 31 in a direction in which the valve shaft 42 moves. However, the disposition and shape of the spring may be changed as necessary. The non-return valve 41 is not limited to a poppet valve, but may be configured as a different type of valve as necessary, such as a needle valve or ball valve.

In the present embodiment, the valve state detector 51 is configured as a gap sensor. The gap sensor is attached to the fixture 29 such that, from an end portion 42b of the valve shaft 42 on the closing side of the moving direction (i.e., the upper side of FIG. 4), the gap sensor is disposed away toward the closing side. The gap sensor detects a gap G between the gap sensor and the valve shaft 42 (in particular, the closing side end portion 42b of the valve shaft 42). A detection method to be adopted by the gap sensor is not particularly limited. For example, an eddy current detection method, a capacitance detection method, or an ultrasonic wave detection method may be adopted. The gap G varies in accordance with a lift amount L of the valving element 41 and the valve shaft 42. In this configuration, when the gap sensor detects a minimum value Gm in a detectable gap range, the lift amount L of the valving element 41 and the valve shaft 42 is zero, and the valving element 41 and the valve shaft 42 are at the closing position. When the gap sensor detects a maximum value GM in the gap range, the lift amount L of the valving element 41 and the valve shaft 42 is the aforementioned maximum lift amount LM, and the valving element 41 and the valve shaft 42 are at the fully open position. Thus, the gap sensor substantially acts as a lift amount sensor detecting the lift amount L.

Figure 4:
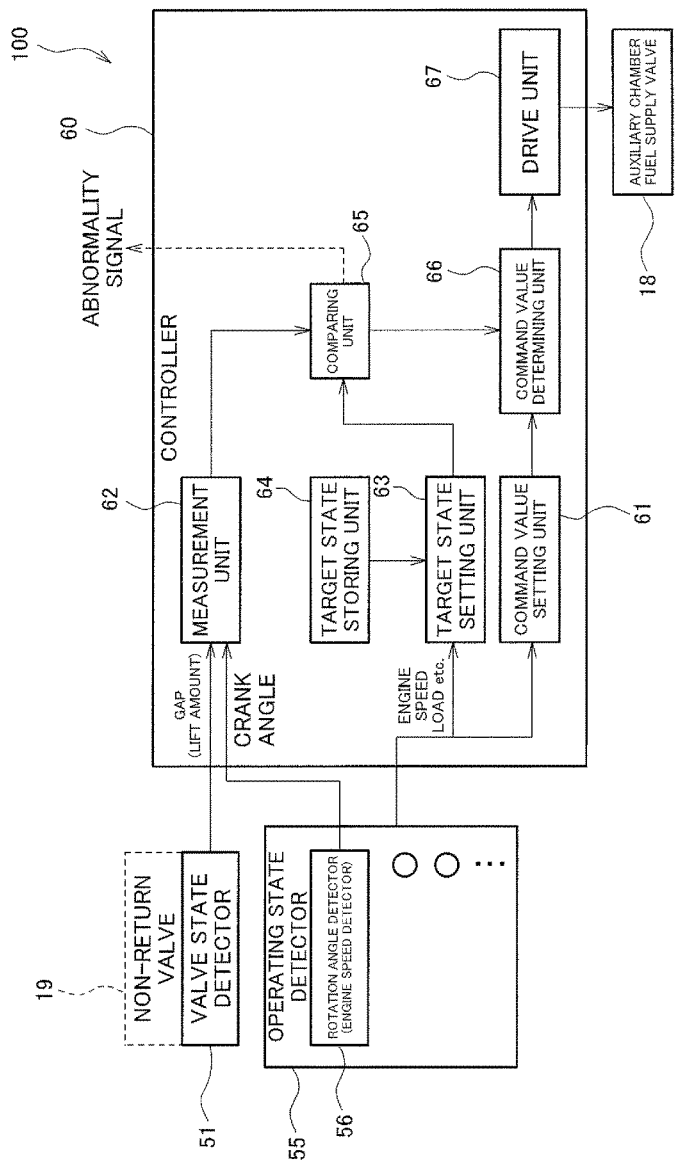
FIG. 4 is a block diagram showing a configuration of the fuel supply controlling device shown in FIG. 2.

FIG. 4 is a block diagram showing a configuration of the fuel supply controlling device 100 shown in FIG. 2. The rotation angle detector 56 detects a rotation angle within one engine cycle constituted by an intake stroke, a compression stroke, an expansion stroke, and an exhaust stroke. The "rotation angle" corresponds to the position of the piston 21 and the crank angle (the rotation angle of the output shaft 2) within one engine cycle (i.e., a period over which the piston 21 makes reciprocating motion twice and the output shaft 2 rotates twice). It should be noted that, as one example of the rotation angle detector 56, FIG. 2 shows a crank angle sensor that is disposed near the output shaft 2 and that detects the crank angle. However, as an alternative, the rotation angle detector 56 may detect rotation angles of rotating members that move in conjunction with the output shaft 2, such as rotation angles of drive cam shafts of the intake and exhaust valves 27 and 28.

The controller 60 is configured to measure an engine speed (the angular velocity of the output shaft 2) based on signals from the rotation angle detector 56. The rotation angle detector 56 has a function as an engine speed detector detecting an engine speed as one example of engine operating conditions, and serves as one example of an operating condition detector 55 detecting the engine operating conditions.

The input of the controller 60 is also connected to the operating condition detector 55 detecting the engine operating conditions. The operating condition detector 55 may include: a load detector detecting the load of the gas engine 1 or a parameter necessary for the controller 60 to perform calculation for estimating the load; a water temperature detector detecting the temperature of cooling water; an exhaust gas temperature detector detecting the temperature of exhaust gas; a supercharging pressure detector detecting a supercharging pressure; and a fuel property detector detecting a property of the gaseous fuel (e.g., source pressure or methane number) or a parameter necessary for the controller 60 to perform calculation for estimating the fuel property. That is, the engine operating conditions may include an engine speed, a load, a cooling water temperature, an exhaust gas temperature, a supercharging pressure, and a fuel property.

The controller 60 sequentially receives values detected by the valve state detector 51, the rotation angle detector 56, and the operating condition detector 55 every predetermined short control period (e.g., every 5 msec). Based on signals inputted from the valve state detector 51 and the rotation angle detector 56, the controller 60 associates the operating state of the non-return valve 19 with the rotation angle, thereby measuring an actual operating state of the non-return valve 19. The controller 60 corrects the operation command values of the auxiliary chamber fuel supply valve 18 such that the measured actual operating state is brought close to a target operating state, and drives the auxiliary chamber fuel supply valve 18 in accordance with the corrected operation command values. In other words, the controller 60 operates the auxiliary chamber fuel supply valve 18 when performing feedback control of the operating state of the non-return valve 19 in association with the rotation angle. In addition, based on signals inputted from the operating condition detector 55, the controller 60 sets pre-correction operation command values of the auxiliary chamber fuel supply valve 18 and the target operating state of the non-return valve 19.

As function blocks for performing such control, the controller 60 includes a command value setting unit 61, a measurement unit 62, a target state setting unit 63, a target state storing unit 64, a comparing unit 65, a command value determining unit 66, and a drive unit 67. The command value setting unit 61, the measurement unit 62, the target state setting unit 63, the comparing unit 65, and the command value determining unit 66 are each realized by a software element of the controller 60 (e.g., a program stored in the ROM in advance). The target state storing unit 64 is realized by a hardware element of the controller 60 (e.g., the ROM). The drive unit 67 is realized by a hardware element of the controller 60 or by a hardware element connected to the output of the controller 60 (e.g., a driver for the auxiliary chamber fuel supply valve 18).

Figure 5:
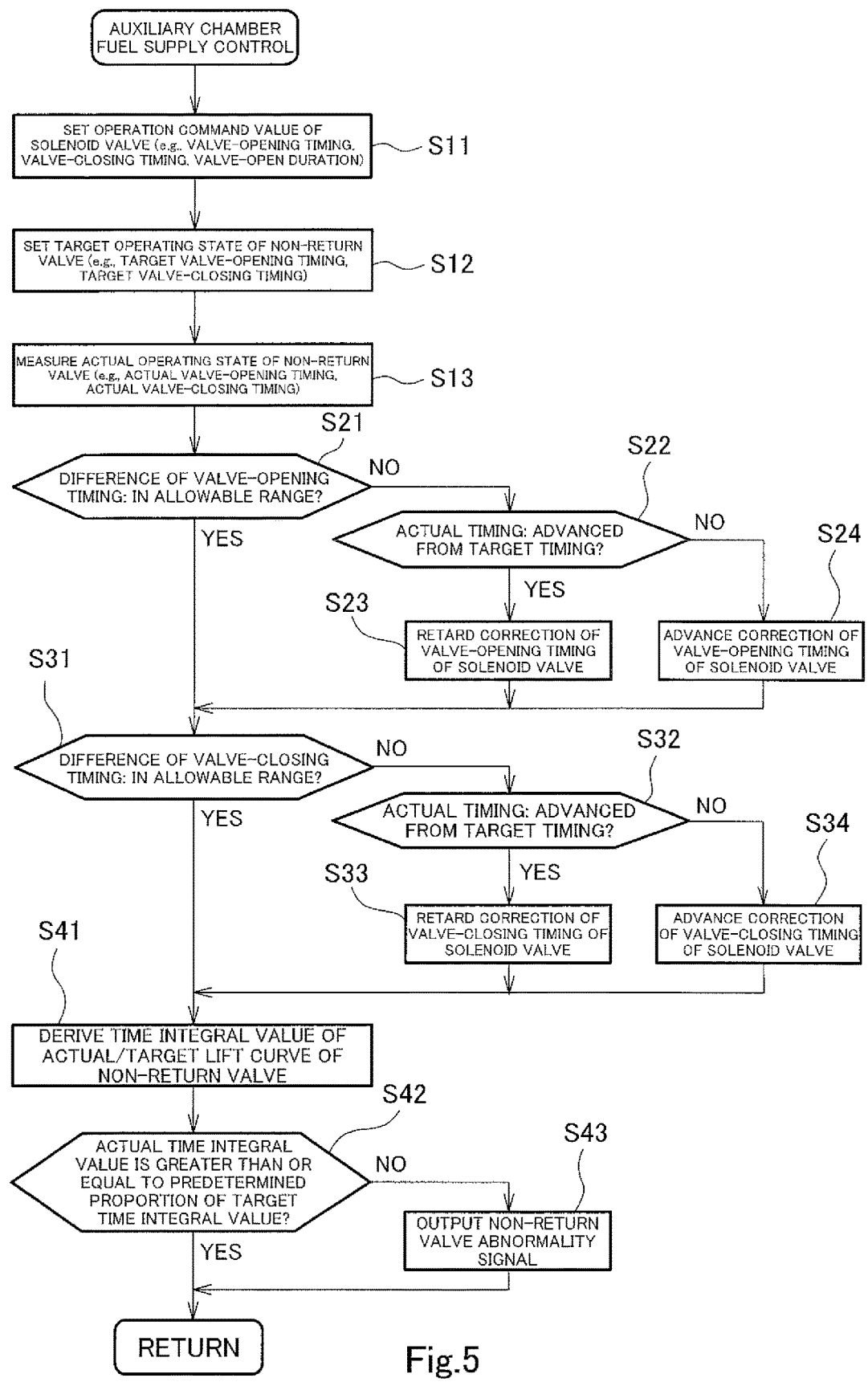
FIG. 5 is a flowchart showing fuel supply control steps performed by a controller shown in FIG. 4.

FIG. 5 is a flowchart showing fuel supply control steps performed by the controller 60 shown in FIG. 4. Hereinafter, operations and functions of the blocks 61 to 67 shown in FIG. 4 are described in accordance with the steps shown in FIG. 5. In the description below, the components of the gas engine 1 and the fuel supply controlling device 100 are denoted by the reference signs used in FIG. 1 to FIG. 4 as necessary. A series of processing shown in FIG. 5 is performed per engine cycle. Alternatively, the series of processing may be performed once every time a predetermined plurality of engine cycles have elapsed or every time a predetermined actual time period has elapsed.

As shown in FIG. 5, first, the command value setting unit 61 sets operation command values of the auxiliary chamber fuel supply valve 18 in accordance with signals from the operating condition detector 55 (step S11). The target state setting unit 63 sets a target operating state of the non-return valve 19 based on signals from the operating condition detector 55 (step S12). Based on signals from the valve state detectors 51 and the rotation angle detector 56, the measurement unit 62 measures the operating state of the non-return valve 19 in association with the rotation angle, thereby obtaining an actual operating state of the non-return valve 19 (step S13). The sequence of steps S11 to S13 may be changed as necessary.

(Setting of Pre-correction Operation Command Values)

In step S11, the operation command values include a valve-opening timing, a valve-closing timing, and a valve-open duration of the auxiliary chamber fuel supply valve 18. When two out of these three values are set, the remaining one value is determined automatically. Therefore, the command value setting unit 61 may set at least two of the operation command values. For the sake of convenience of the description, it is assumed here that the valve-opening timing and the valve-closing timing are set as operation command values.

As previously described, the operation command values are determined in accordance with the engine operating conditions in order to supply the gaseous fuel into the auxiliary chamber 24 in a suitable amount in a timely manner, control the excess air ratio of the air-fuel mixture generated in the auxiliary chamber 24 to be a target value, and make the fuel concentration distribution in the auxiliary chamber 24 uniform. Correspondence relationships of the operation command values with the engine operating conditions (e.g., maps or calculation formulas) are stored in the controller 60 in advance although they are not shown in the drawings. The command value setting unit 61 determines the operation command values in accordance with the correspondence relationships.

(Measurement of Actual Operating State)

Figure 6:
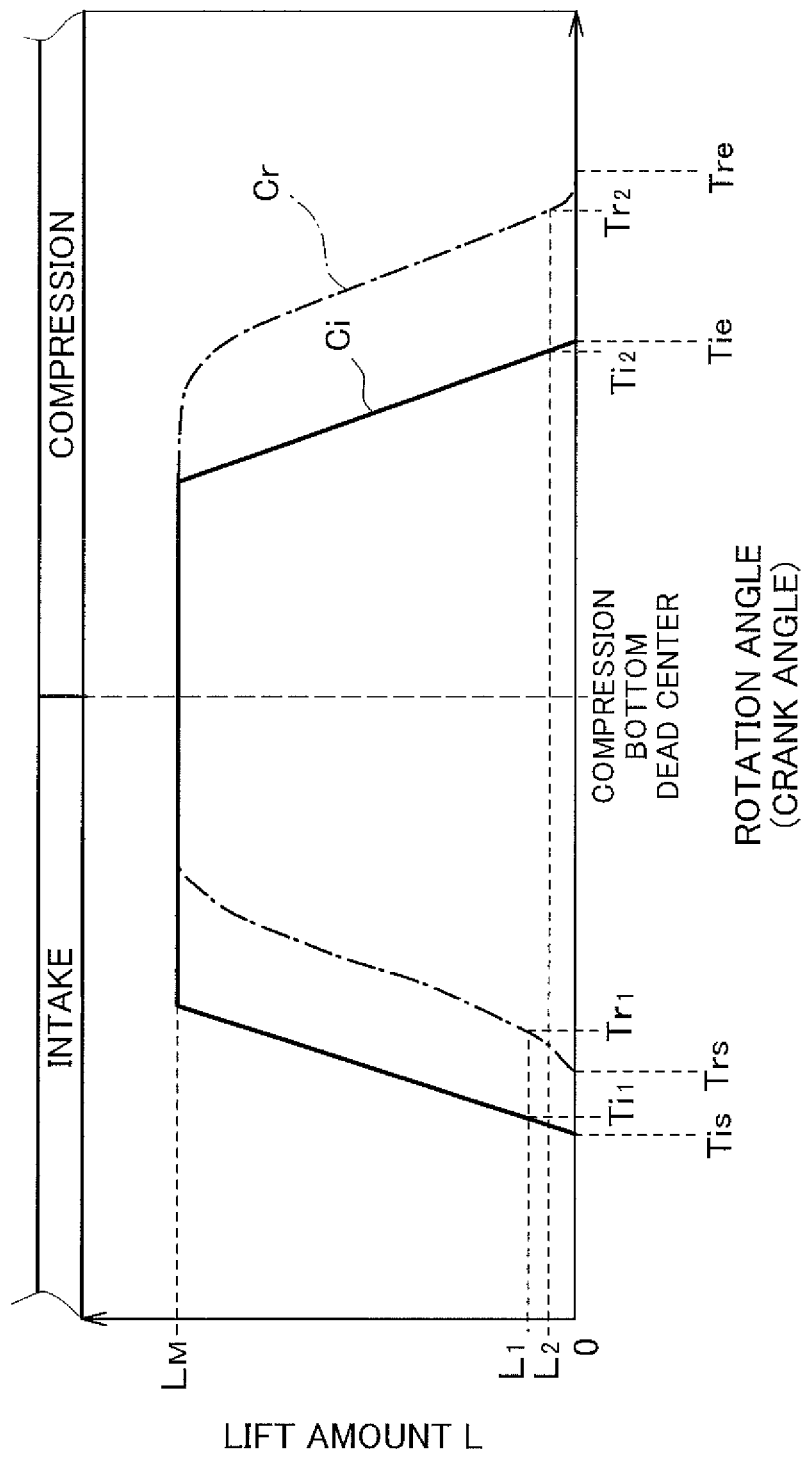
FIG. 6 is a graph showing, in a conceptual manner, one example of an actual operating state and one example of a target operating state of the non-return valve shown in FIG. 3.

FIG. 6 is a graph showing, in a conceptual manner, one example of the actual operating state and one example of the target operating state of the non-return valve 19 shown in FIG. 3. FIG. 6 illustrates a moving amount transition, which indicates how the lift amount L of the non-return valve 19 transitions as the rotation angle advances. The moving amount transition is represented by straight line and/or curve in a two-dimensional orthogonal coordinate system, in which the horizontal axis represents the rotation angle and the vertical axis represents the lift amount L. A chain line represents one example of an actual moving amount transition Cr, which is obtained through a measurement in which the lift amount detected by the gap sensor, which is one example of the valve state detector 51, is measured in association with the crank angle detected by the crank angle sensor, which is one example of the rotation angle detector 56. A solid line represents one example of a target moving amount transition Ci, which is stored in the controller 60 in advance or set by the controller 60 in accordance with the engine operating conditions. In the description below, a straight line and/or a curve in the orthogonal coordinate system may be referred to as a "lift curve".

In step S13, as the actual operating state of the non-return valve 19 associated with the rotation angle, the measurement unit 62 measures; an actual valve-opening timing Tr1, which is an actual timing (rotation angle) at which the non-return valve 19 is switched from a valve-closed state to a valve-opened state; and an actual valve-closing timing Tr2, which is an actual timing (rotation angle) at which the non-return valve 19 is switched from a valve-opened state to a valve-closed state. As described below in detail, the measurement unit 62 also measures an actual integral value Sr (see FIG. 9) of an actual lift curve representing the actual moving amount transition Cr.

Since the valve state detector 51 is configured to detect the lift amount L, the controller 60 can measure the actual integral value Sr of the actual moving amount transition Cr. Meanwhile, the valve state detector 51 is not configured to directly detect whether or not the non-return valve 19 is in a valve-opened state. However, the controller 60 can measure state-switching timings (the actual valve-opening timing Tr1 and the actual valve-closing timing Tr2) by comparing the lift amount L, which is associated with the rotation angle, with a threshold L1 for use in determining whether or not the non-return valve 19 is in a valve-opened state and with a threshold L2 for use in determining whether or not the non-return valve 19 is in a valve-closed state. For the sake of convenience of the description, FIG. 6 illustratively shows constant values different from each other and greater than zero as the two thresholds L1 and L2. However, as an alternative, the thresholds L1 and L2 may be constant values both set to zero (see FIGS. 8A and 8B), or may be set as the same values (see FIGS. 8A and 8B), or may be set as values that vary in accordance with the engine operating conditions (not shown).

The measurement unit 62 measures, as the actual valve-opening timing Tr1, a timing (a rotation angle) at which the lift amount L in an upward trend has become equal to or greater than the valve-opening threshold L1. Similarly, the measurement unit 62 measures, as the actual valve-closing timing Tr2, a timing (a rotation angle) at which the lift amount L in a downward trend has become equal to or less than the valve-closing threshold L2. For example, in a case where the valve-opening threshold L1 is a constant value and zero (see FIGS. 8A and 8B), the measurement unit 62 measures, as the actual valve-opening timing Tr1, a timing Trs at which the lift amount L has increased from zero to exceed zero (i.e., a timing at which the valving element 41 and the valve shaft 42 have started moving from the closing position toward the opening side). For example, in a case where the valve-closing threshold L2 is a constant value and zero (see FIGS. 8A and 8B), the measurement unit 62 measures, as the actual valve-closing timing Tr2, a timing Tre at which the lift amount L has become zero from a positive value (i.e., a timing at which the valving element 41 and the valve shaft 42 moving toward the closing side have stopped at the closing position).

(Setting of Target Operating State)

In step S12, the target state setting unit 63 sets the target operating state. For example, the target operating state includes a target valve-opening timing Ti1, a target valve-closing timing Ti2, and a target integral value Si (see FIG. 9).

The target valve-opening timing Ti1 is a target timing at which the lift amount L is to satisfy the same conditions as those used in the measurement of the actual valve-opening timing Tr1. For example, in a case where the valve-opening threshold L1 is zero, the target valve-opening timing Ti1 is a target timing Tis, at which the lift amount L is to increase from zero to exceed zero (see FIGS. 8A and 8B). The target valve-closing timing Ti2 is a target timing at which the lift amount L is to satisfy the same conditions as those used in the measurement of the actual valve-closing timing Tr2. For example, in a case where the valve-closing threshold L2 is zero, the target valve-closing timing Ti2 is a target timing Tie, at which the lift amount L is to become zero from a positive value (see FIGS. 8A and 8B).

According to one example of the target moving amount transition Ci shown in FIG. 6, the lift amount L increases from the valve-opening threshold L1 to the maximum lift amount LM within a short duration from the target valve-opening timing Ti1; then the lift amount L is kept to the maximum lift amount LM for some duration; and after the auxiliary chamber fuel supply valve 18 is closed, the lift amount L decreases from the maximum lift amount LM to the valve-closing threshold L2 within a short duration to the target valve-closing timing Ti2 in response to the closing of the auxiliary chamber fuel supply valve 18. FIG. 6 shows an example where the upward trend to the maximum lift amount LM and the downward trend from the maximum lift amount LM are both linear. However, as an alternative, these trends may be changed into non-linear trends.

In relation to the setting, by the command value setting unit 61, of the operation command values of the auxiliary chamber fuel supply valve 18 in accordance with the engine operating conditions, the target state setting unit 63 sets the target valve-opening timing Ti1 and the target valve-closing timing Ti2 in accordance with the engine operating conditions in order to cause the non-return valve 19 to suitably operate in response to the operation of the auxiliary chamber fuel supply valve 18. That is, the start timing Tis and the end timing Tie of the target moving amount transition Ci are changed in accordance with the engine operating conditions (i.e., in accordance with the valve-opening timing, the valve-closing timing, and the valve-open duration of the auxiliary chamber fuel supply valve 18).

For example, the target valve-opening timing Ti1 is set by taking required responsiveness into consideration relative to the valve-opening timing of the auxiliary chamber fuel supply valve 18, which is determined in accordance with the engine operating conditions. The target valve-opening timing Ti1 is set in accordance with the engine operating conditions, such that the target valve-opening timing Ti1 becomes the same timing as, or a suitable timing immediately after, the valve-opening timing of the auxiliary chamber fuel supply valve 18. The target valve-closing timing Ti2 is set in a similar manner. The target valve-closing timing Ti2 is set in accordance with the engine operating conditions, such that the target valve-closing timing Ti2 becomes the same timing as, or a suitable timing immediately after, the valve-closing timing of the auxiliary chamber fuel supply valves 18.

Figure 7A:
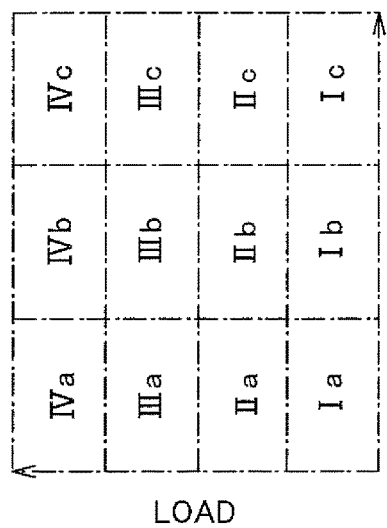
FIG. 7A is a graph showing, in a conceptual manner, one example of an operating range used in setting the target operating state.
Figure 7C:
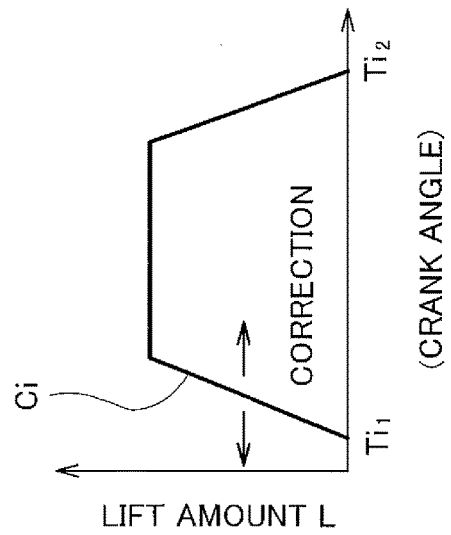
FIG. 7C is a graph showing another example of the setting of the target operating state.
Figure 7B:
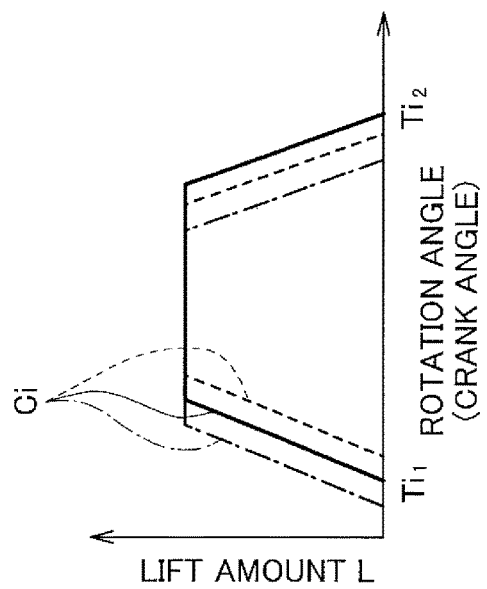
FIG. 7B is a graph showing one example of the setting of the target operating state.

FIG. 7A is a graph showing, in a conceptual manner, one example of an operating range used in setting the target operating state. FIG. 7B is a graph showing one example of the setting of the target operating state. FIG. 7C is a graph showing another example of the setting of the target operating state. The target state setting unit 63 specifies the operating range of the engine based on signals from the operating condition detector 55. As illustratively shown in FIG. 7A, the operating range may be a combination of an engine speed range among ranges a to c and a load range among ranges I to IV (e.g., I-a, II-b, or the like). Alternatively, other engine operating conditions may be used.

As shown in FIG. 7B, a plurality of target moving amount transitions Ci corresponding to a plurality of operating ranges, respectively, may be stored in the target state storing unit 64 in advance. In this case, the target state setting unit 63 selectively sets one target moving amount transition Ci from among the plurality of target moving amount transitions Ci in accordance with the specified operating range. As shown in FIG. 7C, a single target moving amount transition Ci may be stored in the target state storing unit 64. In this case, the target state setting unit 63 corrects the target moving amount transition Ci in accordance with the specified operating range, thereby setting the target moving amount transition Ci in accordance with the operating range of the engine. For example, in a case where the operating range is a high-load range or a high engine speed range, a necessary fuel amount is relatively great. Therefore, in this case, a target valve-open duration is set to be relatively long.

It should be noted that the target moving amount transition Ci (target lift curve) is shown for the sake of convenience of the description. The target moving amount transition Ci need not be stored in the target state storing unit 64 unless the target moving amount transition Ci is directly compared with the actual moving amount transition Cr. If a target integral value Ci of the target lift curve representing the target moving amount transition Cr is to be compared with an actual measurement value as in the present embodiment, the target integral value Ci may be stored in advance since the target integral value Ci can be obtained in advance when the target lift curve is set.

(Correction of Operation Command Values)

Returning to FIG. 5, after steps S11 to S13, the comparing unit 65 compares the actual operating state measured by the measurement unit 62 with the target operating state set by the target state setting unit 63. Based on a result of the comparison, the valve-opening timing and the valve-closing timing of the auxiliary fuel injection valve 18 are corrected.

The comparing unit 65 determines whether or not the difference of the actual valve-opening timing Tr1 from the target valve-opening timing Ti1 is in an allowable range $\Delta Tp1$ (see FIG. 8A) (step S21). If the difference is not in the allowable range $\Delta Tp1$ (S21: NO), it is determined whether or not the actual valve-opening timing Tr1 is advanced from the target valve-opening timing Ti1 (step S22). The allowable range $\Delta Tp1$ includes zero. In step S21, it may be determined whether or not the actual valve-opening timing Tr1 coincides with the target valve-opening timing Ti1. The same is true of step S31 described below.

If the actual valve-opening timing Tr1 is advanced from the target valve-opening timing Ti1 beyond the allowable range $\Delta Tp1$ (S22: YES), the command value determining unit 66 performs retard correction of the valve-opening timing, set by the command value setting unit 61, of the auxiliary chamber fuel supply valve 18 (step S23). If the actual valve-opening timing Tr1 is retarded from the target valve-opening timing Ti1 beyond the allowable range $\Delta Tp1$ (S22: NO), the command value determining unit 66 performs advance correction of the valve-opening timing, set by the command value setting unit 61, of the auxiliary chamber fuel supply valve 18 (step S24). The advance correction amount and the retard correction amount may be predetermined constant values regardless of the aforementioned difference, or may be values that are set proportionally to the difference. In a case where the advance correction amount and the retard correction amount are set proportionally to the difference, upper limit correction values may be set. The same is true of steps S33 and S34 described below.

After the valve-opening timing is corrected, the flow proceeds to step S31. If the difference of the actual valve-opening timing Tr1 from the target valve-opening timing Ti1 is in the allowable range $\Delta Tp1$ (S21: YES), the command value determining unit 66 refrains from correcting the valve-opening timing set by the command value setting unit 61, and proceeds to step S31.

The comparing unit 65 determines whether or not the difference of the actual valve-closing timing Tr2 from the target valve-closing timing Ti2 is in an allowable range $\Delta Tp2$ (see FIG. 8A) (step S31). If the difference is not in the allowable range (S31: NO), it is determined whether or not the actual valve-closing timing Tr2 is advanced from the target valve-closing timing Ti2 (step S32).

If the actual valve-closing timing Tr2 is advanced from the target valve-closing timing Ti2 beyond the allowable range $\Delta Tp2$ (S32: YES), the command value determining unit 66 performs retard correction of the valve-closing timing, set by the command value setting unit 61, of the auxiliary chamber fuel supply valve 18 (step S33). If the actual valve-closing timing Tr2 is retarded from the target valve-closing timing Ti2 beyond the allowable range $\Delta Tp2$ (S32: NO), the command value determining unit 66 performs advance correction of the valve-closing timing, set by the command value setting unit 61, of the auxiliary chamber fuel supply valve 18 (step S34).

After the valve-closing timing is corrected, the flow proceeds to step S41. If the difference of the actual valve-closing timing Tr2 from the target valve-closing timing Ti2 is in the allowable range $\Delta Tp2$ (S31: YES), the command value determining unit 66 refrains from correcting the valve-closing timing set by the command value setting unit 61, and proceeds to step S41.

The drive unit 67 drives the auxiliary chamber fuel supply valve 18, such that the auxiliary chamber fuel supply valve 18 is opened at the valve-opening timing determined by the command value determining unit 66, and such that the auxiliary chamber fuel supply valve 18 is closed at the valve-closing timing determined by the command value determining unit 66. It should be noted that steps S21 to S24, which relate to the correction of the valve-opening timing, may be performed after steps S31 to S34, which relate to the correction of the valve-closing timing.

Figure 8A:
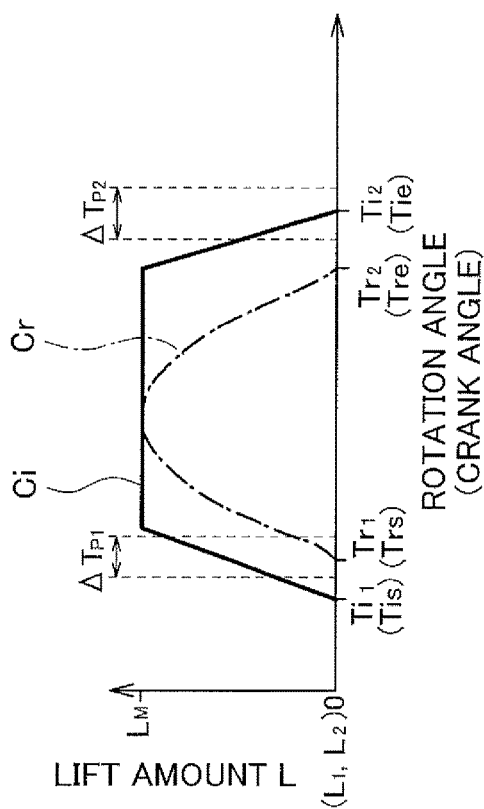
FIG. 8A is a graph showing one example of a case where an actual valve-opening timing is retarded from a target valve-opening timing, and an actual valve-closing timing is advanced from a target valve-closing timing.
Figure 8B:
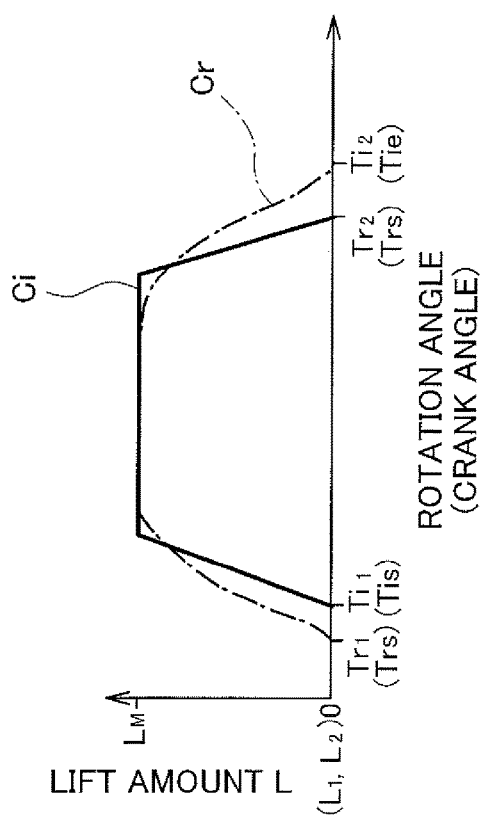
FIG. 8B is a graph showing one example of a case where the actual valve-opening timing is advanced from the target valve-opening timing, and the actual valve-closing timing is retarded from the target valve-closing timing.
Figure 8C:
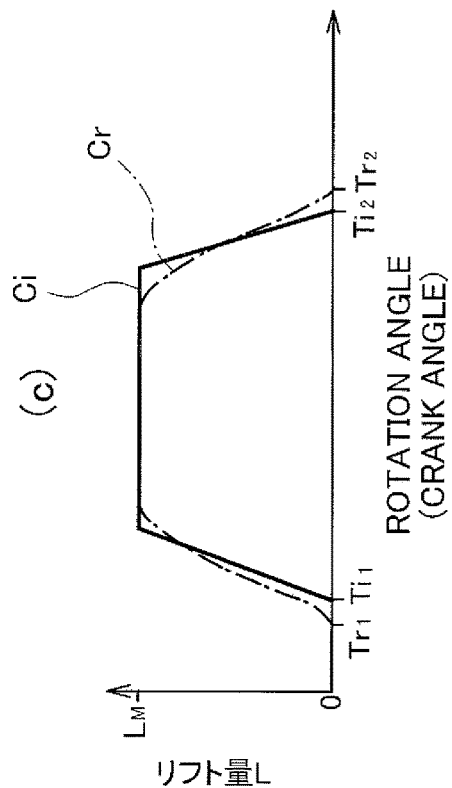
FIG. 8C is a graph showing one example of a case where the actual operating state substantially matches the target operating state.

FIG. 8A is a graph showing one example of a case where the actual valve-opening timing Tr1 is retarded from the target valve-opening timing Ti1, and the actual valve-closing timing Tr2 is advanced from the target valve-closing timing Ti2. FIG. 8B is a graph showing one example of a case where the actual valve-opening timing Tr1 is advanced from the target valve-opening timing Ti1, and the actual valve-closing timing Tr2 is retarded from the target valve-closing timing Ti2. FIG. 8C is a graph showing one example of a case where the actual operating state substantially matches the target operating state.

As shown in FIG. 8A, in a case where the actual valve-opening timing Tr1 is retarded from the target valve-opening timing Ti1, it can be considered that the responsiveness of the non-return valve 19 has become worse than initially estimated for some reason. According to the above-described control, under such circumstances, the advance correction of the valve-opening timing of the auxiliary chamber fuel supply valve 18 is performed (see steps S22 and S24 of FIG. 5). Accordingly, the change in the responsiveness of the non-return valve 19 is compensated for, and the actual valve-opening timing Tr1 of the non-return valve 19 is corrected to be advanced. As a result, the actual valve-opening timing Tr1 of the non-return valve 19 can be brought close to the target valve-opening timing Ti1 (see FIG. 8C). Correction is performed in a similar manner also in a case where the actual valve-closing timing Tr2 is retarded from the target valve-closing timing Ti2 (see steps S32 and S34 of FIG. 5, FIG. 8B, and FIG. 8C).

As shown in FIG. 8B, in a case where the actual valve-opening timing Tr1 is advanced from the target valve-opening timing Ti1, it can be considered that the responsiveness of the non-return valve 19 has become better than initially estimated for some reason. According to the above-described control, under such circumstances, the retard correction of the valve-opening timing of the auxiliary chamber fuel supply valve 18 is performed (see steps S22 and S23 of FIG. 5). Accordingly, the change in the responsiveness of the non-return valve 19 is compensated for, and the actual valve-opening timing Tr1 of the non-return valve 19 is corrected to be retarded. As a result, the actual valve-opening timing Tr1 of the non-return valve 19 can be brought close to the target valve-opening timing Ti1 (see FIG. 8C). Correction is performed in a similar manner also in a case where the actual valve-closing timing Tr2 is advanced from the target valve-closing timing Ti2 (see steps S32 and S33 of FIG. 5, FIG. 8A, and FIG. 8C).

As described above, the fuel supply controlling device 100 according to the present embodiment performs feedback control of the actual valve-opening timing Tr1 and the actual valve-closing timing Tr2 of the non-return valve 19. In the feedback control, the auxiliary chamber fuel supply valve 18 is operated. The feedback control is repeated many times as the engine cycles elapse. Even if the non-return valve 19 degrades by aging, or foreign matter gets caught in the non-return valve 19, or the non-return valve 19 is operated in a manner that does not allow active open-close control, the actual valve-opening timing Tr1 and the actual valve-closing timing Tr2 of the non-return valve 19 can be caused to converge to the target valve-opening timing Ti1 and the target valve-closing timing Ti2, respectively, and timely supply of a suitable amount of gaseous fuel into the auxiliary chamber 24 can be continued. Accordingly, the actual supply start timing and actual supply end timing of the fuel supply to the auxiliary chamber 24 can be suitably controlled. This makes it possible to keep a normal combustion state of the auxiliary chamber 24, thereby improving the combustion efficiency of the main combustion chamber 23 and improving components in the exhaust gas.

In addition, the fuel supply controlling device 100 with the above-described functions can be incorporated into an existing divided-chamber gas engine without causing a significant change in the shape of the engine body (e.g., the shape around the cylinder head) (i.e., by installing the valve state detectors 51 to the vicinity of the non-return valves 19, and adding software elements that realize the measurement unit 62, the target state setting unit 63, the comparing unit 65, and the command value determining unit 66 to the controller 60). The present embodiment is useful also for the reason that such retrofit can be readily made.

The fuel supply controlling device 100 according to the present embodiment obtains operation command values for each of the plurality of auxiliary chamber fuel supply valves 18, which correspond to the respective cylinders 4, and controls the auxiliary chamber fuel supply valves 18 such that the valves 18 are driven independently of each other. Accordingly, even if the responsiveness of the non-return valve 19 to the auxiliary chamber fuel supply valve 18 varies among the cylinders 4 due to individual differences, the individual differences can be compensated for by performing the correction of the valve-opening timing and the valve-closing timing of each auxiliary chamber fuel supply valve 18. Therefore, a suitable amount of gaseous fuel can be supplied into the auxiliary chamber 24 of each of the cylinders 4 in a timely manner, and uniform load sharing by the cylinders 4 can be realized.

(Comparison of Integral Values)

Returning to FIG. 5, after steps S21 to S24 and S31 to S34 for determining whether or not the operation command value correction is necessary and for determining the correction amount in a case where the operation command value correction is necessary, the measurement unit 62 measures the actual integral value Sr (see FIG. 9) of the moving amount transition of the non-return valve 19, and the target state setting unit 63 sets the target integral value Si (see FIG. 9) of the moving amount transition of the non-return valve 19 (step S41). Next, the comparing unit 65 compares the actual integral value Sr with the target integral value Si, and determines whether or not the ratio of the actual integral value Sr to the target integral value Si, or the difference between the actual integral value Sr and the target integral value Si, is in an allowable range (step S42). For example, the comparing unit 65 determines whether or not the actual integral value Sr is greater than or equal to a predetermined proportion α of the target integral value Si (Sr≥Si×α, α<100%). If the ratio or the difference is in the allowable range (S42: YES), the series of processing is ended, and the flow returns to step S11 to start the next round of the processing. If the ratio or the difference is not in the allowable range (S42: NO), the controller 60 outputs an abnormality signal (step S43).

Figure 9:
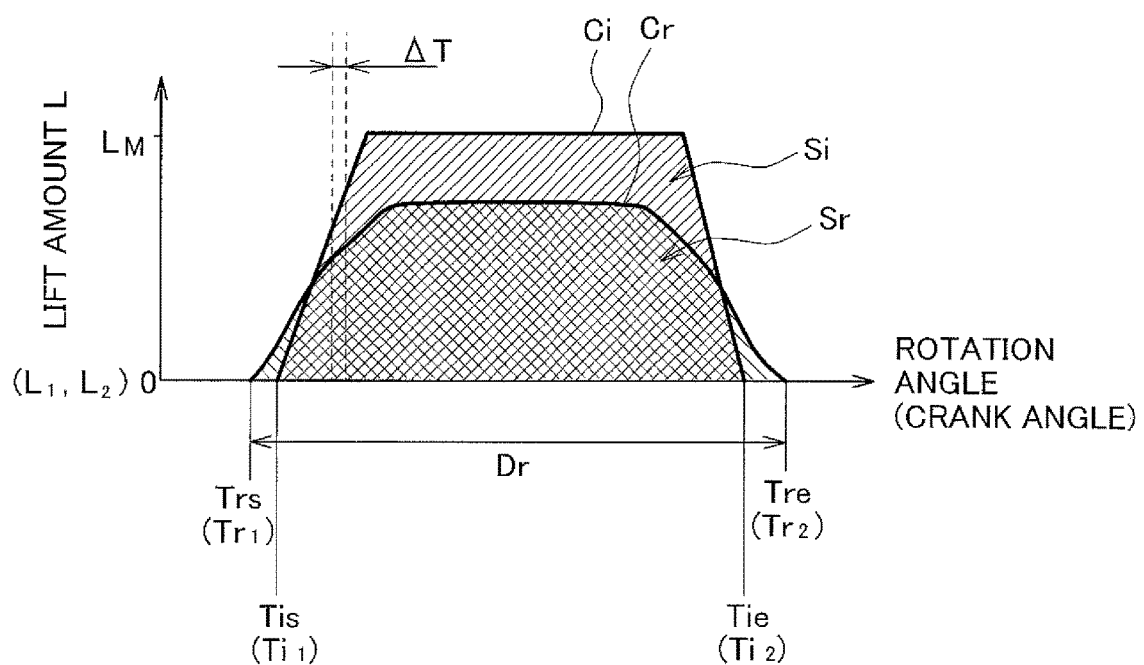
FIG. 9 is a graph conceptually showing one example of an actual integral value and one example of a target integral value of a moving amount transition of the non-return valve shown in FIG. 3.

FIG. 9 is a graph conceptually showing one example of the actual integral value Sr and one example of the target integral value Si of the moving amount transition of the non-return valve 19 shown in FIG. 3. In FIG. 9, similar to FIG. 6, one example of the actual moving amount transition Cr and one example of the target moving amount transition Ci are represented by lift curves in a two-dimensional orthogonal coordinate system, in which the horizontal axis represents the rotation angle and the vertical axis represents the lift amount L.

The actual integral value Sr is a time integral value of the actual lift curve representing the actual moving amount transition Cr (see a portion with downward diagonal hatching to the right in FIG. 9). The lift amount L is inputted to the controller 60 every predetermined short control period ΔT (e.g., 5 msec) sequentially. In light of this, the measurement unit 62 may add up lift amounts L that are sequentially inputted during a duration Dr from the timing Trs, at which the lift amount L increases from zero, to the timing Tre, at which the lift amount L returns to zero, thereby obtaining the actual integral value Sr. Alternatively, the actual integral value Sr may be obtained by integration of a function within the duration Dr, the function representing the actual lift curve. It should be noted that if the valve-opening threshold L1 is zero, the actual valve-opening timing Tr1 is the same as the timing Trs, and is the lower limit of the integration interval. If the valve-closing threshold L2 is zero, the actual valve-closing timing Tr2 is the same as the timing Tre, and is the upper limit of the integration interval. In the present embodiment, since the gap sensor detecting the lift amount L is adopted as the valve state detector 51, the measurement unit 62 can measure the actual integral value Sr.

Since the measurement unit 62 measures the actual integral value Sr in the above-described manner, the target integral value Si of the moving amount transition is stored in the controller 60 in advance (e.g., in the target state storing unit 64). The target integral value Si is a time integral value of the target lift curve representing the target moving amount transition Ci (see a portion with downward diagonal hatching to the left in FIG. 9). The target integral value Si can be obtained by setting the target moving amount transition Ci.

The integral values Sr and Si thus obtained have a positive correlation with the amount of gaseous fuel supplied to the auxiliary chamber 24 through the non-return valve 19. Meanwhile, as previously described, the actual valve-opening timing Tr1 and the actual valve-closing timing Tr2 of the non-return valve 19 are controlled to be close to the target valve-opening timing Ti1 and the target valve-closing timing Ti2, respectively. Therefore, if the actual integral value Sr is significantly less than the target integral value Si, it can be considered that some abnormality that cannot be overcome by merely correcting the operation command values of the auxiliary chamber fuel supply valve 18 is occurring. Examples of such abnormality are as follows: the valving element 41 is unable to move properly; the fuel source pressure has dropped; or the fuel is leaking from the auxiliary chamber fuel line 13b at a position between the auxiliary chamber fuel supply valve 18 and the non-return valve 19. In such an abnormal situation, it is difficult to continue operating the gas engine 1 while keeping a normal combustion state in the auxiliary chamber 24. In the present embodiment, if the ratio of the actual integral value Sr to the target integral value Si, or the difference between the actual integral value Sr and the target integral value Si, is not in an allowable range, an abnormality signal is outputted. Specifically, based on signals from the valve state detector 51 and the rotation angle detector 56, the controller 60 measures the actual integral value Sr of the moving amount transition regarding the moving amount of the valving element 41 of the non-return valve 19, the moving amount being associated with the rotation angle. Based on a result of comparison of the actual integral value Sr with the target integral value Si of the moving amount transition, the controller determines whether or not the non-return valve 19 is operating normally. As described above, the gas engine 1 according to the present embodiment can start fail-safe control or stop its operation in accordance with the abnormality signal, and is capable of suitably addressing the above-described abnormal situations.

Although the embodiment of the present invention has been described above, the above-described configurations are non-limiting examples, and changes, deletions, and additions may be suitably made thereto without departing from the spirit of the present invention. For example, although a single non-return valve is provided on the auxiliary chamber fuel line in the above-described embodiment, a plurality of non-return valves may be arranged in series on the auxiliary chamber fuel line. In this case, the same functional advantages as those described above can be obtained by performing feedback control of the operating state of the most downstream non-return valve in the same manner as described above.

INDUSTRIAL APPLICABILITY

The present invention is useful when applied to a divided-chamber gas engine. The divided-chamber gas engine to which the present invention is applied is utilized as a prime mover in various applications, for example, in a power generating unit, a marine main engine, etc.

REFERENCE SIGNS LIST 1 gas engine
2 output shaft (crank shaft)
18 auxiliary chamber fuel supply valve
19 non-return valve
24 auxiliary chamber
32 fuel port
41 valving element
51 valve state detector
55 operating condition detector
56 rotation angle detector
60 controller
100 fuel supply controlling device
Tr1 actual valve-opening timing
Tr2 actual valve-closing timing
Ti1 target valve-opening timing
Ti2 target valve-closing timing
Cr actual moving amount transition
Ci target moving amount transition
Sr actual integral value
Si target integral value
L lift amount

The invention claimed is:

1. A fuel supply controlling device for use in a divided-chamber gas engine, comprising:
an auxiliary chamber fuel supply valve configured to supply a gaseous fuel to an auxiliary chamber;
a non-return valve interposed between the auxiliary chamber fuel supply valve and the auxiliary chamber, the non-return valve being configured to block a reverse flow from the auxiliary chamber in a valve-closed state, become a valve-opened state as a result of a valving element of the non-return valve being moved by pressure of the gaseous fuel when the auxiliary chamber fuel supply valve is opened, and in the valve-opened state, allow a flow of the gaseous fuel from the auxiliary chamber fuel supply valve into the auxiliary chamber;
a valve state detector configured to detect an operating state of the non-return valve, the detected operating state including the valve-opened state or the valve-closed state of the non-return valve, or a lift amount of the non-return valve;

a rotation angle detector configured to detect at least one of a rotation angle of a crank shaft or a rotation angle of a cam shaft; and a controller configured to determine an operation command value of the auxiliary chamber fuel supply valve, wherein the controller measures an actual operating state of the non-return valve based on signals from the valve state detector and the rotation angle detector, the actual operating state being associated with the detected rotation angle, and corrects the operation command value of the auxiliary chamber fuel supply valve such that the actual operating state is brought close to a target operating state.

2. The fuel supply controlling device for use in a divided-chamber gas engine, according to claim 1, comprising an operating condition detector configured to detect an operating condition of the gas engine, wherein the controller sets the target operating state in accordance with a signal from the operating condition detector.

3. The fuel supply controlling device for use in a divided-chamber gas engine, according to claim 1, wherein the actual operating state of the non-return valve includes a valve-opening timing of the non-return valve, and the controller measures an actual valve-opening timing of the non-return valve based on signals from the valve state detector and the rotation angle detector, the actual valve-opening timing being associated with the detected rotation angle, and corrects the operation command value of the auxiliary chamber fuel supply valve such that the actual valve-opening timing is brought close to a target valve-opening timing.

4. The fuel supply controlling device for use in a divided-chamber gas engine, according to claim 3, wherein in a case where the actual valve-opening timing is advanced from the target valve-opening timing beyond an allowable advance amount, the controller performs retard correction of a valve-opening timing of the auxiliary chamber fuel supply valve, and in a case where the actual valve-opening timing is retarded from the target valve-opening timing beyond an allowable retard amount, the controller performs advance correction of the valve-opening timing of the auxiliary chamber fuel supply valve.

5. The fuel supply controlling device for use in a divided-chamber gas engine, according to claim 1, wherein the actual operating state of the non-return valve includes a valve-closing timing of the non-return valve, and the controller measures an actual valve-closing timing of the non-return valve based on signals from the valve state detector and the rotation angle detector, the actual valve-closing timing being associated with the detected rotation angle, and corrects the operation command value of the auxiliary chamber fuel supply valve such that the actual valve-closing timing is brought close to a target valve-closing timing.

6. The fuel supply controlling device for use in a divided-chamber gas engine, according to claim 1, wherein the non-return valve includes a valving element configured to move between a closing position, at which the valving element closes a fuel port open to the auxiliary chamber, and a fully open position, which is away from the closing position, the non-return valve opens when the fuel port is opened as a result of the valving element moving from the closing position toward the fully open position, the valve state detector is configured to detect a moving distance of the valving element, and the controller measures an actual integral value of a moving distance transition regarding the moving distance of the valving element, the moving distance being associated with the detected rotation angle, based on signals from the valve state detector and the rotation angle detector, and determines whether or not the non-return valve is operating normally based on a result of comparison of the actual integral value with a target integral value of the moving distance transition.

* * * * *